US011398235B2

(12) United States Patent
Tian et al.

(10) Patent No.: US 11,398,235 B2
(45) Date of Patent: Jul. 26, 2022

(54) METHODS, APPARATUSES, SYSTEMS, DEVICES, AND COMPUTER-READABLE STORAGE MEDIA FOR PROCESSING SPEECH SIGNALS BASED ON HORIZONTAL AND PITCH ANGLES AND DISTANCE OF A SOUND SOURCE RELATIVE TO A MICROPHONE ARRAY

(71) Applicant: Alibaba Group Holding Limited, Grand Cayman (KY)

(72) Inventors: Biao Tian, Hangzhou (CN); Zhaowei He, Hangzhou (CN); Tao Yu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 267 days.

(21) Appl. No.: 16/553,376

(22) Filed: Aug. 28, 2019

(65) Prior Publication Data
US 2020/0075012 A1    Mar. 5, 2020

(51) Int. Cl.
| | |
|---|---|
| *G10L 15/26* | (2006.01) |
| *G06T 1/00* | (2006.01) |
| *G10L 17/06* | (2013.01) |
| *G10L 21/0364* | (2013.01) |
| *G06F 3/01* | (2006.01) |
| *G10L 15/25* | (2013.01) |
| *H04R 1/40* | (2006.01) |

(Continued)

(52) U.S. Cl.
CPC .......... *G10L 15/25* (2013.01); *G06V 40/171* (2022.01); *G10L 15/02* (2013.01); *G10L 15/05* (2013.01); *G10L 15/22* (2013.01); *G10L 25/78* (2013.01); *H04R 1/406* (2013.01); *H04R 3/005* (2013.01)

(58) Field of Classification Search
CPC ....... G06T 1/0014; G10L 17/06; G10L 15/26; G10L 21/0364; G06F 3/017
USPC ...................................... 318/568.12; 701/28
See application file for complete search history.

(56) References Cited

U.S. PATENT DOCUMENTS

| | | | |
|---|---|---|---|
| 7,711,560 | B2 | 5/2010 | Yamada et al. |
| 8,918,162 | B2 | 12/2014 | Prokoski |

(Continued)

*Primary Examiner* — Farzad Kazeminezhad
(74) *Attorney, Agent, or Firm* — James J. DeCarlo; Greenberg Traurig, LLP

(57) ABSTRACT

The disclosed embodiments disclose methods, apparatuses, systems, devices and computer-readable storage media for processing speech signals. The method comprises: acquiring a real-time image by using an image capturing device, performing facial recognition by using the real-time image, and detecting a period during which a target user makes speech sounds based on a facial recognition result; locating a sound source in an audio signal received by a microphone array, and determining the orientation information of a sound source in the audio signal; and based on the period during which the target user in the real-time image makes the speech sounds and the orientation information of the sound source, performing a speech sound start and end point analysis to determine start and end time points of the speech sounds in the audio signal. The method for processing speech signals according to one embodiment can perform voice activity detection to the speech signal in noisy environments containing multiple sources of interference, thereby improving the anti-interference capability of the system.

18 Claims, 6 Drawing Sheets

(51) Int. Cl.
  *G10L 15/02* (2006.01)
  *G10L 15/05* (2013.01)
  *G10L 25/78* (2013.01)
  *G10L 15/22* (2006.01)
  *H04R 3/00* (2006.01)
  *G06V 40/16* (2022.01)

(56) References Cited

U.S. PATENT DOCUMENTS

| | | |
|---|---|---|
| 8,983,836 B2 | 3/2015 | Woodward et al. |
| 9,031,293 B2 | 5/2015 | Kalinli-Akbacak |
| 10,140,986 B2 | 11/2018 | Froelich |
| 2004/0104702 A1* | 6/2004 | Nakadai ............ G06T 1/0014 318/568.12 |
| 2006/0028556 A1 | 2/2006 | Bunn et al. |
| 2015/0019206 A1 | 1/2015 | Wilder et al. |
| 2016/0070957 A1 | 3/2016 | Steiner |
| 2016/0167648 A1* | 6/2016 | James ................ G06F 3/017 701/28 |
| 2017/0160813 A1 | 6/2017 | Divakaran et al. |
| 2017/0256259 A1 | 9/2017 | Froelich |
| 2018/0039990 A1 | 2/2018 | Lindemann |
| 2018/0041503 A1 | 2/2018 | Lindemann |
| 2018/0061415 A1 | 3/2018 | Penilla et al. |
| 2018/0233127 A1* | 8/2018 | Visser ................ G10L 15/26 |
| 2018/0277135 A1* | 9/2018 | Ali .................. G10L 21/0364 |
| 2018/0286409 A1* | 10/2018 | Baughman ............ G10L 17/06 |
| 2018/0314689 A1 | 11/2018 | Wang et al. |
| 2019/0147228 A1 | 5/2019 | Chaudhuri |

\* cited by examiner

METHODS, APPARATUSES, SYSTEMS, DEVICES, AND COMPUTER-READABLE STORAGE MEDIA FOR PROCESSING SPEECH SIGNALS BASED ON HORIZONTAL AND PITCH ANGLES AND DISTANCE OF A SOUND SOURCE RELATIVE TO A MICROPHONE ARRAY

CROSS-REFERENCE TO RELATED APPLICATIONS

This application claims the benefit of priority of Chinese Application No. 201811009263.3 filed on Aug. 31, 2018, which is hereby incorporated by reference in its entirety.

BACKGROUND

Technical Field

The present disclosure relates to the technical field of data processing, and in particular to methods, apparatuses, systems, devices, and computer-readable storage media for processing speech signals.

Description of the Related Art

In speech recognition systems, correct and effective voice activity detection (VAD) can not only reduce the computation load and processing time of said systems, but can also eliminate the noise interference of silent segments and improve the accuracy of speech recognition performed by these systems. Since a speech signal contains not only the required useful speech sound segment but also useless background noise segments, VAD can detect the start and end points of speech sounds in a given speech signal. The speech signal is then divided into two categories, namely speech sound segments and silent segments (also referred to as background noise segments).

In some current systems, a speech sound energy detector is usually used to perform VAD, but this speech sound segment detection method often fails in noisy environments, resulting in interfering speech sounds being sent to a speech recognition engine as target speech sounds. The inclusion of these interfering speech sounds consequently weakens the anti-interference capability of the speech recognition system.

SUMMARY

The disclosed embodiments provide methods, apparatuses, systems, devices, and computer-readable storage media for processing speech signals, which can improve the anti-interference capability of a speech recognition system in noisy environments containing multiple sources of interference.

According to one embodiment, a method for processing speech signals is provided comprising: performing facial recognition within a visual range of an image capturing device, and detecting whether a target user makes speech sounds according to a facial recognition result; locating a sound source in a received sound signal under recognition, and determining a speech signal existing in a target area based on a sound source locating result and a detection result with respect to whether the target user makes speech sounds; and performing voice activity detection to the speech signal existing in the target area to obtain a speech sound segment under recognition in the speech signal.

According to another embodiment, an apparatus for processing speech signals is provided, comprising: performing facial recognition within a visual range of an image capturing device, and detecting whether a target user makes speech sounds according to a facial recognition result; locating a sound source in a received sound signal under recognition, and determining a speech signal existing in a target area based on a sound source locating result and a detection result with respect to whether the target user makes speech sounds; and performing voice activity detection to the speech signal existing in the target area to obtain a speech sound segment under recognition in the speech signal.

According to another embodiment, a device for processing speech signals is provided, comprising a memory and a processor, wherein the memory is used for storing a program; and the processor is used for reading executable program codes stored in the memory to execute the above-described method for processing speech signals.

According to another embodiment, a system for processing speech signals is provided, comprising: an image capturing device used for acquiring a real-time image; a speech sound acquisition device used for receiving an audio signal; and a data processing device used for performing facial recognition by using the real-time image, and detecting a period during which a target user makes speech sounds based on a facial recognition result; locating a sound source in an audio signal received by a microphone array, and determining the orientation information of a sound source in the audio signal; and based on the period during which the target user in the real-time image makes the speech sounds and the orientation information of the sound source, performing a speech sound start and end point analysis to determine start and end time points of the speech sounds in the audio signal.

According to another embodiment, a computer-readable storage medium is provided, wherein the computer-readable storage medium stores instructions, which, when executed on a computer, cause the computer to execute the above-described method for processing speech signals according to each of the aspects.

The methods, apparatuses, systems, devices, and computer-readable storage media for processing speech signals according to the disclosed embodiments can perform voice activity detection on speech signals in noisy environments containing multiple sources of interference, thereby improving the anti-interference capability of the system.

DETAILED DESCRIPTION

Figure 1:
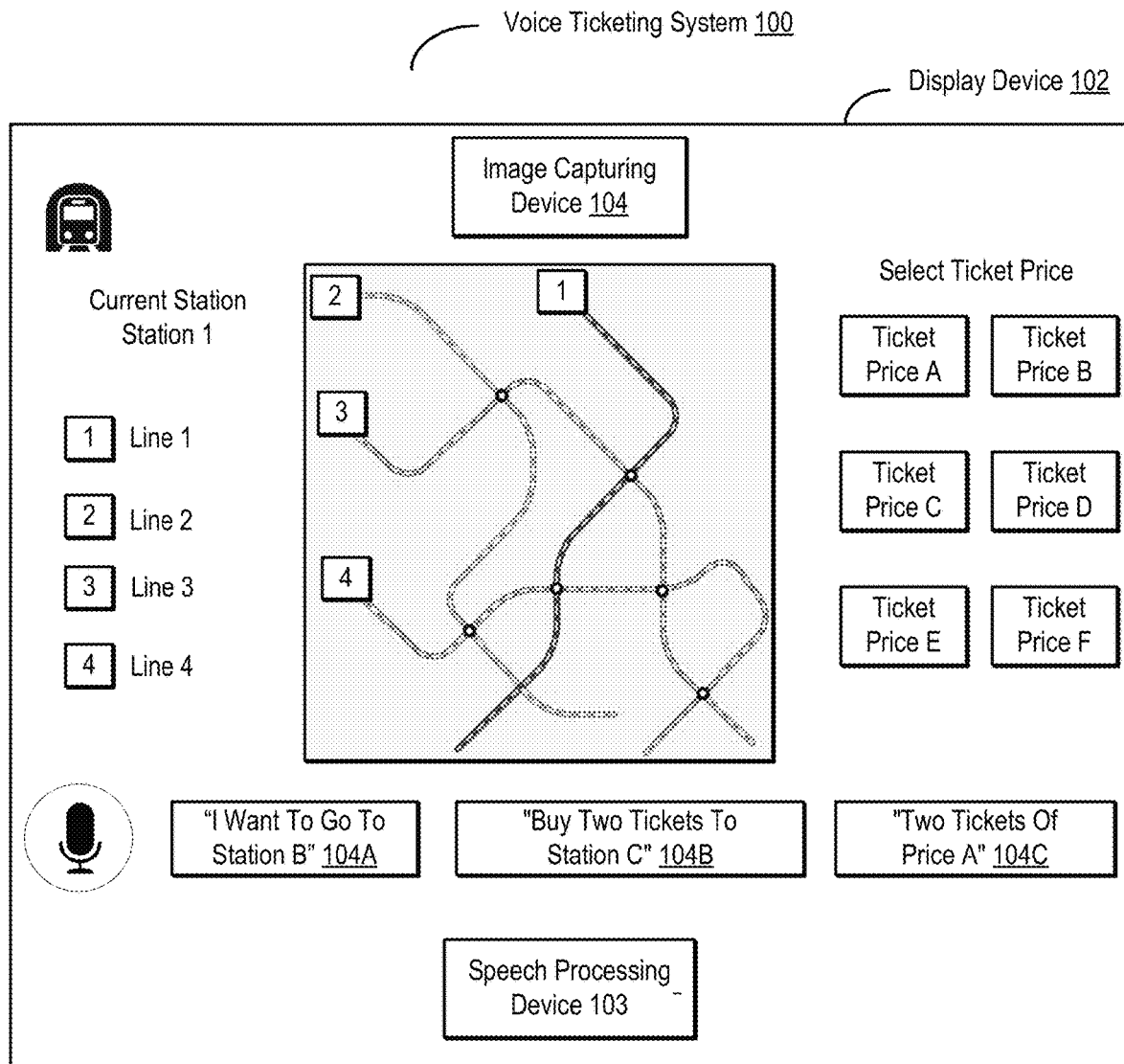
FIG. 1 is a block diagram illustrating a voice ticketing system according to some embodiments of the disclosure.

The features and disclosed embodiments are described in detail below. To make the purposes, technical solutions, and advantages of the disclosed embodiments clearer, the embodiments will be described in further detail with reference to the drawings. The embodiments are exemplary and should not be interpreted as unduly limiting the scope of the disclosure. For those skilled in the art, the embodiments may be implemented without requiring some of the specific details. The following description is intended to provide a better understanding of the disclosed embodiments by providing specific examples.

Relation terms such as "first" and "second" are used to distinguish one entity or operation from another entity or operation, and do not require or imply that the entities or operations have this actual relation or order. The terms "include," "comprise" or other variations thereof are intended to cover non-exclusive inclusion, so that a process, a method, an article, or a device including a series of elements not only includes the elements, but also includes other elements not clearly listed, or further includes inherent elements of the process, method, article, or device. The element defined by the statement "comprising . . . ," without further limitation, does not exclude the presence of additional identical elements in the process, method, article, or device that comprises the element.

In the disclosed embodiments, speech signal processing systems such as intelligent sound equipment, intelligent voice shopping machines, intelligent voice ticket vending machines, and intelligent voice elevators usually need to capture and process speech signals in noisy environments containing multiple sources of interference. Examples of noisy environments include, but are not limited to, shopping malls, metro stations, social places, or any environments where people interact.

In the description of the following embodiments, a microphone array may be used to perform signal sampling and signal processing to sound signals from different spatial directions in noisy environments containing multiple sources of interference. Each acoustic sensor, such as a microphone, in the microphone array may be referred to as an array element, and each microphone array comprises at least two array elements. Each array element may be regarded as a sound capturing channel, and multi-channel sound signals may be obtained by using a microphone array comprising a plurality of array elements.

The microphone array may be an array formed by a group of acoustic sensors located at different positions in a space and arranged according to a certain shaping rule, and performs spatial sampling to sound signals transmitted in the space. The shape arrangement formed by the acoustic sensors arranged in the microphone array may be referred to as the topological structure of the microphone array. According to the topological structure of the microphone array, microphone arrays may be divided into linear microphone arrays, planar microphone arrays and stereoscopic microphone arrays.

As an example, a linear microphone array can comprise an arrangement of array elements such that the centers of the array elements are located on the same straight line, e.g., a horizontal array. A planar microphone array can comprise an arrangement of the array elements such that the centers of the array elements are distributed on a plane, e.g., a triangular array, a circular array, a T-array, an L-array or a square array. A stereoscopic microphone array can comprise an arrangement of array elements such that the centers of the array elements are distributed in a stereoscopic space, e.g., a polyhedral array or a spherical array.

The specific form of the employed microphone array is not intended to be limiting. As an example, the microphone array may be a horizontal array, a T-array, an L-array or a square array. Each type of array may be used in the disclosed embodiments.

In one embodiment, the deployment of speech signal processing usually includes various sources of interference such as environmental noise, speech sound interference, reverberation, and echoes. Reverberation may be considered as an acoustic phenomenon, wherein a superimposed sound signal is formed when both the sound signal and acoustic waves are repetitively reflected or absorbed by obstacles during transmission. An echo may also be considered as an acoustic echo, which may be construed as a repetitive sound signal formed by transmission and reflection of sounds played by a loudspeaker of a speech processing device, and the repetitive sound signal is transmitted back to the microphone to form noise interference. The above sources of interference such as environmental noise, speech sound interference, reverberation, and echoes create a strong-interference, complex, and changeable acoustic environment, which impairs the quality of user voices captured by the speech processing system.

In one embodiment, a multimodal speech recognition system refers to a computer speech recognition system that fuses various methods for speech recognition. As an example, the multimodal speech recognition system can not only process conventional audio information, but this system can also improve the recognition effect of human-computer interaction through the visual information of faces and mouths.

Voice ticketing at a metro station is provided as one example and an application scenario of the disclosed methods for processing speech signals are described below.

FIG. 1 is a block diagram illustrating a voice ticketing system according to some embodiments of the disclosure.

As illustrated in FIG. 1, a voice ticketing environment of the metro station may comprise a voice ticketing system (100) and a ticket buyer (101). The voice ticketing system (100) comprises a display device (102), a speech processing device (103) and an image capturing device (104). The voice ticketing system (100) can allow the ticket buyer (101) to, by means of voice interaction, buy a ticket by specifying a station name or a ticket price, or by performing a fuzzy search based on a destination.

In one embodiment, the display device (102) may comprise a microphone array (not illustrated in FIG. 1), and the speech processing device (103) may use a plurality of sound acquisition channels provided by a plurality of array elements in the microphone array to capture a sound signal from the actual ticketing environment in real time.

In one embodiment, the display device (102) may be a large screen display device for displaying recommended voice interaction instructions, which may be instruction examples (104*a*, 104*b*, 104*c*) having a guiding effect on the voice interaction between the ticket buyer (101) and the speech processing device (103). For example, and as illustrated, "I want to go to station B," "buy two tickets to station C," and "two tickets of price A." The display device (102) can display the nearest recommended metro line and station to the destination by calling a map service according to the destination in the voice interaction instruction given by the ticket buyer (101), after the speech processing device (103) performs processing. The display device (102) can also display payment information, such that the ticket buyer (101) pays according to the displayed payment information and the voice ticketing system (100) completes ticket output.

In the actual ticketing environment, the sound signal under recognition captured by the speech processing device (103) using the microphone array not only comprises the target speech signal from the target sound source, but also comprises non-target speech signals from various sources of interference such as environmental noise, speech sound interference, reverberation, and echoes in the sound pickup range of the microphone array. As an example, environmental noise may include, for example, noise generated by the operation of metro trains and the operation of ventilation and air conditioning equipment and speech sound interference may be, for example, speech signals given by people except the ticket buyer (101).

To pick up valid speech signals and provide a robust speech recognition effect in noisy environments containing multiple sources of interference, the disclosed embodiments provide methods, apparatuses, systems, and computer-readable storage media for processing speech signals, which can perform voice activity detection in noisy environments containing multiple sources of interference such as public places in combination with multimodal information such as computer vision detection, sound source location information, and speech probability detection, and can extract clean and accurate speech sound segments for speech recognition.

Methods for processing speech signals according to the disclosed embodiments will be described in detail below with reference to FIG. 2 and FIG. 3. It should be noted that the embodiments described in the description of FIGS. 2 and 3 are not intended to limit the scope of the disclosure.

Figure 2:
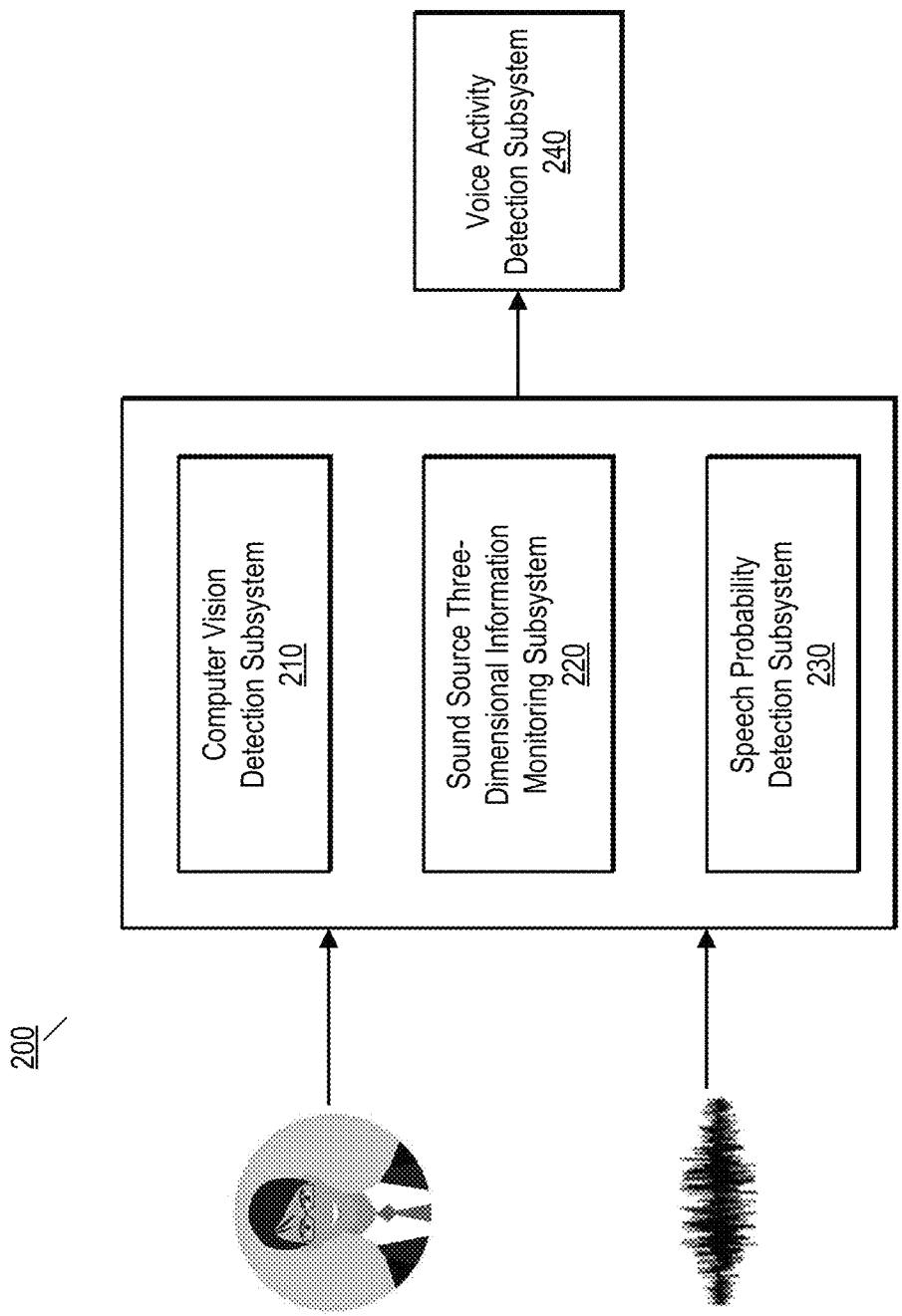
FIG. 2 is a block diagram illustrating a system for processing speech signals according to some embodiments of the disclosure.
Figure 3:
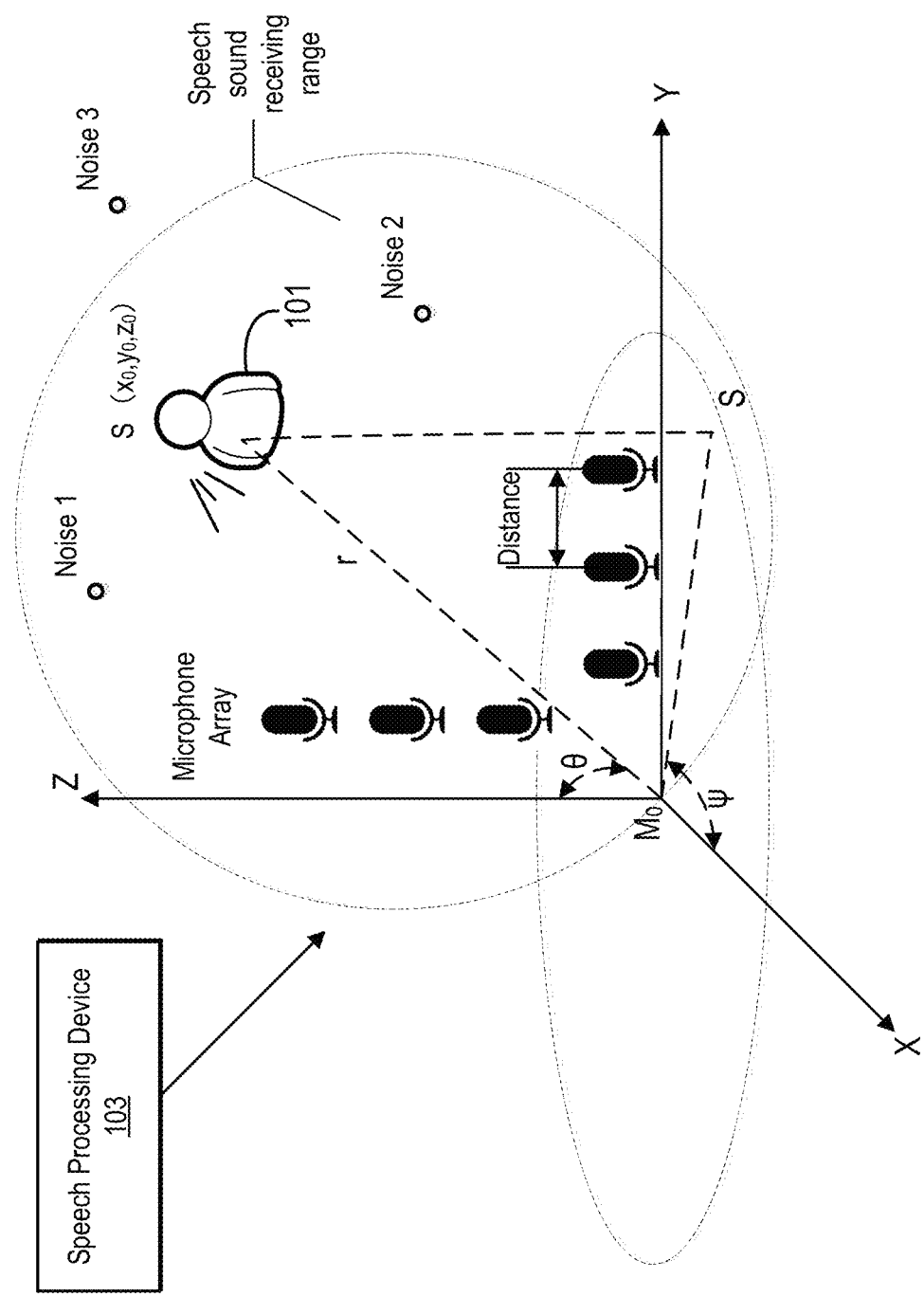
FIG. 3 is a diagram illustrating a scenario in which a microphone array locates a sound source in a target area according to some embodiments of the disclosure.

FIG. 2 is a block diagram illustrating a system for processing speech signals according to some embodiments of the disclosure. FIG. 3 is a diagram illustrating a scenario in which a microphone array locates a sound source in a target area according to some embodiments of the disclosure.

As illustrated in FIG. 2, a system for processing speech signals (200) can comprise a computer vision detection subsystem (210), a sound source three-dimensional information monitoring subsystem (220), a speech probability detection subsystem (230), and a voice activity detection subsystem (240).

In one embodiment, vision-based speech sound detection refers to performing facial recognition within the visual range of the image capturing device through the computer vision detection subsystem (210) and determining a period during which a target user makes speech sounds according to a facial recognition result.

In one embodiment, the computer vision detection subsystem (210) may comprise a video/image capturing device and a video/image processing module.

In one embodiment, a real-time image is acquired by the video/image capturing device such as a camera, which captures a video or real-time image within the visual range of the camera. Based on the captured video or image, it is detected whether there is a face in the visual range, and if there is a face, then facial feature point information is extracted. By extracting the facial feature point information, the change of the information of feature points on the mouth edge is determined to determine whether the mouth makes an opening and closing action. If there is an opening and closing action, it can be determined that this user is a target user who makes the speech sounds, and a continuous period of the mouth opening and closing action of the target user in the real-time image is regarded as the period during which the target user makes the speech sounds.

As an example, in the extraction of facial visual feature point information, the feature points of the mouth edge are usually selected, and mouth feature information, such as the mouth height, mouth width, mouth shape, mandible position, and mandible speed, is captured from the selected feature points of the mouth edge. The change of the mouth feature point information is detected based on the captured feature information, and the movement of the mouth muscle, such as the mouth opening and closing action, is estimated based on the change of the mouth feature point information, such that it can be determined that this user is speaking according to the mouth opening and closing action.

In one embodiment, to improve the detection efficiency of the mouth feature, it is not necessary to detect the mouth feature directly from the entire captured image. Because the mouth is smaller than the face target, face detection can be performed on the captured video or multiple images first, and then mouth feature detection is performed in the video or image area where a face is detected to improve the efficiency and accuracy of mouth detection.

In one embodiment, sound source three-dimensional information monitoring may be collected via the microphone array, and three-dimensional information monitoring is performed to the sound source target in the configured target area to implement the spatial information monitoring of sound signals from different directions in the target area.

As illustrated in FIG. 3, in one embodiment, sound signals received from different directions by using the microphone array may be regarded as sound signals under recognition. Within the sound pickup range of the microphone array, sound signals under recognition may include sound signals from the target sound source, as well as sound signals from sources of interference such as noise 1, noise 2, and noise 3.

In one embodiment, spatial positioning may be performed to the sound signal under recognition through the Direction of Arrival (DOA) to determine the direction or position of the target sound source in the sound signal under recognition containing background noise.

In this embodiment, the DOA is used to indicate the direction of arrival of acoustic waves at the reference array element in the microphone array, namely, the included angle between the transmission direction of the speech signal and the normal direction of the microphone array relative to the reference array element in the microphone array. In some embodiments, the included angle may also be referred to as the angle of arrival of the speech signal.

In this embodiment, sound signals from different directions may be positioned based on DOA estimation. Specifically, the direction of arrival of a wave beam may be obtained through DOA estimation, and triangulation is performed by using multiple DOAs estimated by receiving array elements of the microphone array to obtain the estimated position of the sound source target.

In this embodiment, the orientation information of each sound signal may be determined by performing DOA estimation to each of the sound signals under recognition. Based on the orientation information of each sound signal, the position of the sound source of the plurality of speech signals received by the microphone array is detected, and the sound signals satisfying the threshold range of the angle of arrival are regarded as candidate sound source targets. As an example, the threshold range of the angle of arrival may be configured to be, for example, in a range of 0-180 degrees.

Referring to FIG. 3, the sound source three-dimensional information detection subsystem (220) may detect the spatial three-dimensional information of the candidate sound source targets obtained by DOA estimation. For example, the spatial three-dimensional information of the candidate sound source targets may comprise a horizontal angle, a pitch angle, and a distance of the candidate sound source targets relative to the microphone array.

In one embodiment, the three-dimensional spatial coordinate system of the microphone array may be established in advance. As an example, in the three-dimensional spatial coordinate system of the microphone array, the coordinate origin $M_0$ may be the central position of the microphone array in the speech processing device (103), or the position of any array element in the microphone array, or any other specified position.

In one embodiment, the offset distance of each array element relative to the coordinate origin $M_0$ may be determined based on the arrangement order of the array elements in the microphone array and the distance between the array elements to determine the three-dimensional spatial coordinates of each array element $M_i$ relative to the coordinate origin $M_0$.

In one embodiment, it is assumed that the candidate sound source target is located at a spatial position point S in the three-dimensional space, and the three-dimensional coordinates of the position point S may be represented by $S(x_0, y_0, z_0)$, where $x_0$, $y_0$ and $z_0$ are respectively coordinate values of the position point S at X, Y and Z axes of the coordinate system in the three-dimensional space, and $(x_0, y_0, z_0)$ represents the three-dimensional spatial coordinates of the spatial position point S.

In this embodiment, the three-dimensional spatial coordinates and the coordinate vector of the spatial position point S satisfy:

$$(x_0, y_0, z_0) = r_0(\sin\theta_0 \cos\varphi_0, \sin\theta_0 \sin\varphi_0, \cos\theta_0),$$

where $r_0$ represents the distance between the spatial position point $S(x_0, y_0, z_0)$ of the candidate sound source target and the coordinate origin $M_0$ (0, 0, 0) of the three-dimensional spatial coordinate system, the pitch angle $\theta_0$ represents the included angle between the connecting line formed by the spatial point S and the coordinate origin $M_0$ and the positive direction of the Z axis, and the horizontal angle $\varphi_0$ represents the included angle between the connecting line formed by the projection S' of the spatial point S on the XOY plane and the coordinate origin $M_0$ and the positive direction of the X axis. Herein, the value range of the horizontal angle $\varphi_0$ may be $0° \leq \varphi \leq 360°$, and the value range of the pitch angle $\theta_0$ may be $0° \leq \theta_0 \leq 90°$.

In one embodiment, $r_0$ may be referred to as the distance between the spatial position point S and the microphone array, $\theta_0$ may be referred to as the pitch angle between the spatial position point S and the microphone array, and $\varphi_0$ may be referred to as the horizontal angle between the Spatial position point S and the microphone array.

In one embodiment, after detecting the difference between the time that the sound signal from the same sound source arrives at two different array elements, the difference between the distance that the sound signal from the same sound source arrives at two different array elements can be calculated by using the time difference, and the position or direction of the sound source relative to the microphone array can be calculated through the principle of geometric analysis by using the difference between the distance that the sound signal from the same sound source arrives at two different array elements, the three-dimensional spatial coordinates of each array element in the microphone array and the three-dimensional spatial coordinates of the sound source.

In one embodiment, to improve the processing efficiency of the voice interaction device (103), the speech sound receiving range of the microphone array may be configured in advance, namely, the range of the pitch angle, the range of the horizontal angle, and the range of the distance relative to the microphone array, only the sound source within the sound pickup range is responded to and processed, and the audio signals outside the speech sound receiving range are regarded as noise signals, thereby reducing the acquisition range of the target user and improving the calculation efficiency of the voice interaction device (103).

In one embodiment, the spatial range of the speech sound receiving area of the microphone array may be determined according to the actual application scenario. In the voice ticketing application scenario, the ticket buyer (101) is usually located in a relatively fixed area near the voice ticketing system 100, and the probability that sound signals from this area include the target sound source is higher. Therefore, in one embodiment, the set target area satisfies the following conditions, namely, the coordinate vector of any spatial point $R(x_i, y_i, z_i)$ in the target area satisfies $r_i \leq r_{max}$, $\theta_i \leq \theta_{max}$, $\varphi_i \leq \varphi_{max}$.

In other words, the distance between the spatial point R in the target area and the microphone array is smaller than or equal to the preset maximum distance $r_{max}$, the horizontal angle between the spatial point R and the microphone array is smaller than or equal to the preset maximum horizontal angle $\varphi_{max}$, and the pitch angle between the spatial point R and the microphone array is smaller than or equal to the preset maximum pitch angle $\theta_{max}$.

As illustrated in FIG. 3, After locating the sound sources in the sound signal under recognition based on DOA estimation, the orientation information of the plurality of sound sources such as noise 1, noise 2, noise 3, and the ticket buyer (101) can be determined. In this example, by setting the speech sound receiving range of the microphone array, some sources of interference, such as the noise 3 located outside the speech sound receiving range, can be effectively filtered.

In one embodiment, by monitoring the spatial information of the audio signal in the speech sound receiving area, the detection range of the sound sources can be reduced, and the detection accuracy of the sound sources and the operation efficiency of the speech processing device can be improved.

In one embodiment, to improve the accuracy of speech recognition, a speech sound existence probability of the audio signal in the speech sound receiving range can be detected by the speech probability detection subsystem (230). If the speech sound existence probability of the audio signal is greater than the preset probability threshold, then the speech signal in the speech sound receiving range is determined, and a speech sound start and end point analysis is performed on the audio signal in the speech sound receiving range.

In one embodiment, the speech probability detection subsystem (230) can determine the speech sound existence probability of the target area by analyzing the features of the audio signal, or determine the speech sound existence probability of the target area through a speech sound detection model. In some embodiments, the speech sound existence probability of the target area may also be determined by combining audio signal feature analysis and a voice activity modeling model. The steps for determining the speech sound existence probability of the target area in the disclosed embodiments will be described below in detail through specific embodiments.

In one embodiment, audio signals are periodic signals, and time domain analysis and frequency domain analysis are two different methods of periodic analysis of audio signals. Simply put, a time domain may be used to describe the relationship between speech signals and time, namely, time is used as a variable to analyze the dynamic change of speech signals with time; and a frequency domain may be used to describe the relationship between speech signals and frequency, namely, frequency is used as a variable to analyze the features of speech signals at different frequencies.

In one embodiment, the speech sound existence probability of the target area may be determined by analyzing audio signal features, which, for example, may be key features such as amplitude change and spectrum distribution of audio signals.

In one embodiment, the amplitude of the audio signal represents the distance of vibration of the audio signal from the highest position to the lowest position. Because in the time domain of the speech signal, the noise signal is usually a speech signal segment with an amplitude that changes slightly, while the amplitude of the speech signal segment containing the speech sound of the speaker usually greatly fluctuates. According to this principle, an amplitude change threshold for recognizing noise signals may be preset. By extracting the amplitude change value of the audio signals, the amplitude change value of audio signals can be compared with the amplitude change threshold to determine the speech sound existence probability in the audio signals from different directions in the detected target area.

In this embodiment, according to the amplitude change of the time domain signal of the audio signal existing in the target area, if the time domain signal of the audio signal contains an audio signal segment with an amplitude change value greater than the preset amplitude change threshold, then it is determined that the speech sound existence probability of the audio signal existing in the target area is high.

In one embodiment, the frequency spectrum of the audio signal may be construed as the frequency distribution curve of the audio signal. Usually, in the frequency domain of the speech signal, the spectrum distribution of noise signals is uniform, while the spectrum distribution of the speech signal segment containing the speech sound of the speaker changes greatly. Therefore, for the audio signal received by the microphone array in the target area, whether there is a speech signal in the audio signal received in the target area can be determined by extracting the spectrum distribution feature and comparing the extracted spectrum distribution feature with the spectrum distribution threshold.

As an example, the spectrum distribution feature may be the statistical feature of the power value variance of each frame of audio signal in the frequency domain. In other words, the variance of the power value of each frame of signal in the audio signal is extracted, the extracted variance of the power value is compared with the preset variance threshold, and if the frequency domain signal of the audio signal contains an audio signal segment with the variance of the power value of each frame of signal greater than the variance threshold, then it is determined that the speech sound existence probability of the audio signal is high.

In one embodiment, the extracted feature value of the audio signal may be compared with preset system thresholds in combination with the key features such as the extracted amplitude change and spectrum distribution of the audio signal. If the comparisons all indicate that the speech sound existence probability of the audio signal is high, then it is determined that there is a speech signal in the audio signal in the target area.

In one embodiment, the speech sound existence probability of the audio signals from different directions in the target area may also be detected through a speech sound detection model.

In one embodiment, a neural network model for detecting speech signals and non-speech signals may be constructed in advance, and then the neural network model is trained by using positive samples labeled as speech sounds and negative samples labeled as non-speech sounds. The neural network model obtained by training and capable of performing voice activity detection may be referred to as a speech sound detection model. This embodiment does not specify the specific form of the neural network model, and the neural network model may be, for example, a deep neural network, a recurrent neural network, or a convolutional neural network.

In one embodiment, positive samples labeled as speech sounds can represent sound segments containing acoustic features of speech signals, and negative samples labeled as non-speech sounds can represent sound segments not containing acoustic features of speech signals.

In one embodiment, the speech sound detection model is used to perform voice activity detection to the audio signal in the speech sound receiving range. If the output of the voice activity modeling model is that the audio signal in the speech sound receiving range comprises a speech signal, then it is determined that the probability that the audio signal in the speech sound receiving range comprises the speech signal is high.

Referring to FIG. 2, based on the visual detection information of the computer vision detection subsystem (210), the sound source location information of the sound source three-dimensional information monitoring subsystem (220), and the analysis result of the speech sound existence probability of the speech probability detection subsystem (230), the voice activity detection subsystem (240) is used to determine the start and end time points of the audio signal in the speech sound receiving range.

In one embodiment, the sound source location information of the sound source three-dimensional information monitoring subsystem (220) may be used to determine the speech sound receiving range of the microphone array and acquire the audio signal in the speech sound receiving range, and the speech sound start and end time points of the audio signal in the speech sound receiving range are determined through voice activity detection; and if the speech sound period determined based on the speech sound start and end time points is in the period during which the target user makes the speech sounds, then the speech sound start and end time points of the audio signal in the speech sound receiving range are regarded as the start and end time points of the speech sounds in the audio signal received by the microphone array.

In one embodiment, to improve the accuracy of the speech processing system, the sound source location information of the sound source three-dimensional information monitoring subsystem (220) is used to determine the speech sound receiving range of the microphone array, speech sound detection is performed on the audio signal in the speech sound receiving range, and the speech sound existence probability of the audio signal in the speech sound receiving range is determined; if the speech sound existence probability of the audio signal in the speech sound receiving range is greater than the preset probability threshold, then a speech sound start and end point analysis is performed on the audio signal in the speech sound receiving range through voice activity detection to determine the start and end time points of the speech sounds in the audio signal in the speech sound receiving range; and if the start and end time points of the speech sounds in the audio signal in the speech sound receiving range is within the period during which the target user makes the speech sounds, then the speech sound start and end time points of the audio signal in the speech sound receiving range are regarded as the start and end time points of the speech sounds in the audio signal received by the microphone array.

In one embodiment, Voice Activity Detection (VAD) is used for acquiring speech sound segments in audio signals, determining the start points and end points of the speech sound segments in the audio signals, and extracting the speech sound segments in the audio signals to eliminate the interference of silent segments and non-speech signals, reduce the calculation pressure of the speech recognition system, and improve the response speed of the speech recognition system.

In one embodiment, the speech sound segments obtained through voice activity detection may be input into the speech recognition system for speech recognition. In one embodiment, voice activity detection can not only reduce the computation load and processing time, but also remove the interference of background noise during silence, and improve the anti-interference and speech recognition performance of the system.

Figure 4:
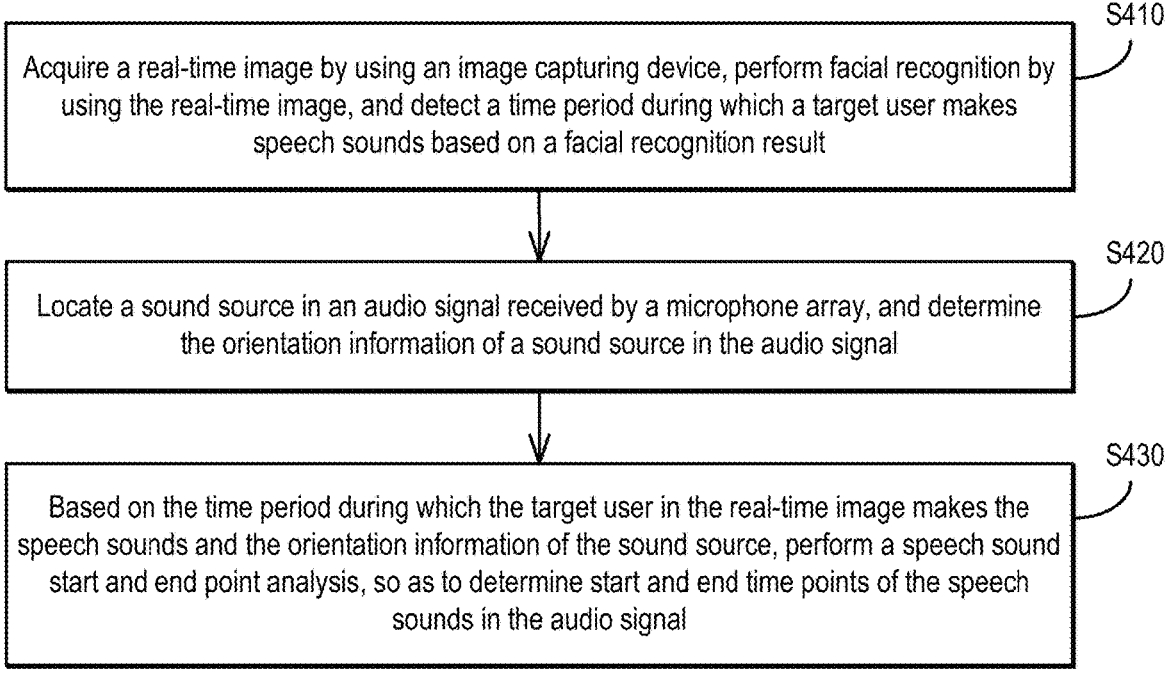
FIG. 4 is a flow diagram illustrating a method for processing speech signals according to some embodiments of the disclosure.

FIG. 4 is a flow diagram illustrating a method for processing speech signals according to some embodiments of the disclosure. As illustrated in FIG. 4, one embodiment of a method for processing speech signals (400) comprises the following steps.

In step S410, a real-time image is acquired by using an image capturing device, facial recognition is performed by using the real-time image, and a period during which a target user makes speech sounds is detected based on a facial recognition result.

In one embodiment, the step of performing facial recognition by using the real-time image may specifically comprise the following steps.

In step S411, the method (400) determines whether there is a facial image in the real-time image is detected.

In step S412, when there is a facial image in the real-time image, facial feature point recognition is performed to the facial image to determine feature points of the mouth edge in the facial image.

In one embodiment, the step of detecting a period during which a target user makes speech sounds based on a facial recognition result may specifically comprise the following steps.

In step S413, feature points of the mouth edge in the facial recognition result are acquired, and whether there is a mouth opening and closing action is determined based on the feature value change information of the feature points of the mouth edge.

In step S414, the method (400) regards a user who makes the mouth opening and closing action as the target user.

In step S415, a continuous period of the mouth opening and closing action of the target user in the real-time image is regarded as the period during which the target user makes the speech sounds.

In this embodiment, the mouth opening and closing action is detected based on the change information of the mouth feature points in the face to determine the target user who makes the speech sounds and the period during which the target user makes the speech sounds.

In step S420, a sound source in an audio signal received by a microphone array is located, and the orientation information of a sound source in the audio signal is determined.

In one embodiment, step S420 may comprise: locating the sound source to obtain the orientation information of the sound source in the audio signal, wherein the orientation information comprises the horizontal angle, pitch angle, and distance of the sound source relative to the microphone array.

In this embodiment, three-dimensional information monitoring of the horizontal angle, pitch angle, and distance of the sound signal is achieved based on the microphone array, such that spatial information monitoring of the target can be achieved in the presence of multiple speakers or other sources of interference which sound to restrict the speech sound receiving range; the sounds out of the set angles (the horizontal angle and/or pitch angle) and distance range are regarded as noise, and no recognition response is made to improve the processing efficiency of the speech signal processing system and the implementation of the anti-interference capability of the system to sources of interference.

In step S430, based on the period during which the target user in the real-time image makes the speech sounds and the orientation information of the sound source, a speech sound start and end point analysis is performed to determine start and end time points of the speech sounds in the audio signal.

In one embodiment, to improve the processing efficiency and accuracy of the audio signal, the speech sound existence probability of the audio signal in the sound pickup area may be detected first. If the speech sound existence probability is greater than the probability threshold, then a speech sound start and end point analysis is performed on the audio signal in the sound pickup range.

In one embodiment, step S430 may comprise the following steps.

In step S431, based on the orientation information of the sound source, the speech sound receiving range of the microphone array is determined, and the audio signal in the speech sound receiving range is acquired.

In step S432, speech sound detection is performed on the audio signal in the speech sound receiving range to determine the speech sound existence probability of the audio signal in the speech sound receiving range.

In step S433, if the speech sound existence probability of the audio signal in the speech sound receiving range is greater than a preset probability threshold, then based on the period during which the target user in the real-time image makes the speech sounds and the orientation information of the sound source, a speech sound start and end point analysis is performed to determine start and end time points of the speech sounds in the audio signal.

In one embodiment, step S432 may specifically comprise the following steps.

The acoustic feature of the audio signal is extracted through speech sound detection; the feature value of the acoustic feature is compared with the system threshold of the acoustic feature of the speech signal, and whether there is a speech signal in the audio signal is determined based on the comparison result; and the speech sound existence probability is determined based on whether there is a speech signal in the audio signal.

In this step, the feature value of the sound signal may be key features of sound signals, such as amplitude change and spectrum distribution.

In another embodiment, step S432 may comprise determining a probability that there is a speech signal in the audio signal by using a voice activity detection component, wherein the voice activity detection component is obtained by training a neural network model by using speech sound samples and non-speech sound samples in advance.

In one embodiment, in step S430 or step S433, the step of, based on the period during which the target user in the real-time image makes the speech sounds and the orientation information of the sound source, performing a speech sound start and end point analysis to determine start and end time points of the speech sounds in the audio signal may specifically comprise the following steps.

In step S11, based on the orientation information of the sound source, the speech sound receiving range of the microphone array is determined.

In step S12, the audio signal in the speech sound receiving range is acquired and start and end time points of the speech sounds in the audio signal in the speech sound receiving range is determined.

In step S13, if a speech sound period determined by the start and end time points of the speech sounds is within the period during which the target user makes the speech sounds, the start and end time points of the speech sounds in the audio signal in the speech sound receiving range are regarded as the start and end time points of the speech sounds in the audio signal.

In one embodiment, in step S12, the step of determining start and end time points of the speech sounds in the audio signal in the speech sound receiving range may specifically comprise performing audio enhancement processing on the audio signal in the speech sound receiving range; and determining start and end points of the speech sounds in the audio signal after the audio enhancement processing in the speech sound receiving range.

In one embodiment, audio enhancement processing may comprise beam forming processing and noise reduction processing.

In the method for processing speech signals according to one embodiment, based on the received visual detection information, sound source location information and speech sound existence probability, a speech sound start and end point analysis is performed to the enhanced audio signal to determine the start and end time points in the audio signal, and the audio of the segment is sent to a speech recognition engine for speech recognition, thus effectively improving the implementation of the anti-interference capability of the speech processing system to sources of interference, and realizing the robust interaction performance of the speech signal processing system in severe interference environments.

Figure 5:
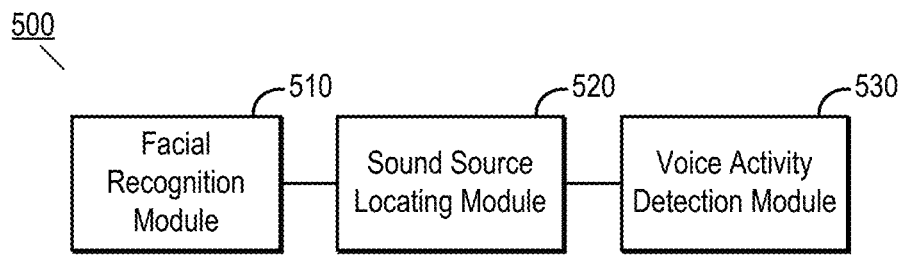
FIG. 5 is a block diagram illustrating an apparatus for processing speech signals according to some embodiments of the disclosure.

FIG. 5 is a block diagram illustrating an apparatus for processing speech signals according to some embodiments of the disclosure. As illustrated in FIG. 5, the apparatus for processing speech signals (500) may include the following modules (510, 520, 530).

A facial recognition module (510) is configured for acquiring a real-time image by using an image capturing device, performing facial recognition by using the real-time image, and detecting a period during which a target user makes speech sounds based on a facial recognition result.

A sound source locating module (520) is configured for locating a sound source in an audio signal received by a microphone array, and determining the orientation information of a sound source in the audio signal.

A voice activity detection module (530) is configured for, based on the period during which the target user in the real-time image makes the speech sounds and the orientation information of the sound source, performing a speech sound start and end point analysis to determine start and end time points of the speech sounds in the audio signal.

In one embodiment, the facial recognition module (510) may comprise: an image detection unit configured for detecting whether there is a facial image in the real-time image; and a mouth feature point determination unit configured for, when there is a facial image in the real-time image, performing facial feature point recognition to the facial image to determine feature points of the mouth edge in the facial image.

In this embodiment, the facial recognition module (510) may further comprise: a mouth opening and closing determination unit configured for acquiring feature points of the mouth edge in the facial recognition result, and determining whether there is an action based on the feature value change information of the feature points of the mouth edge; a target user determination unit configured for regarding a user who makes the mouth opening and closing action as the target user; a speech sound period determination unit configured for regarding a continuous period of the mouth opening and closing action of the target user in the real-time image as the period during which the target user makes the speech sounds.

In one embodiment, the sound source locating module (520) may be specifically configured for locating the sound source to obtain the orientation information of the sound source in the audio signal, wherein the orientation information comprises the horizontal angle, pitch angle, and distance of the sound source relative to the microphone array.

In one embodiment, the voice activity detection module (530) may specifically comprise: a speech sound receiving range determination unit configured for, based on the orientation information of the sound source, determining the speech sound receiving range of the microphone array, and acquiring the audio signal in the speech sound receiving range; and a speech sound detection unit configured for performing speech sound detection to the audio signal in the speech sound receiving range to determine the speech sound existence probability of the audio signal in the speech sound receiving range.

The voice activity detection module (530) may further be configured for, if the speech sound existence probability of the audio signal in the speech sound receiving range is greater than a preset probability threshold, then based on the period during which the target user in the real-time image makes the speech sounds and the orientation information of the sound source, performing a speech sound start and end point analysis to determine start and end time points of the speech sounds in the audio signal.

In one embodiment, the speech sound detection unit may be specifically configured for: extracting the acoustic feature of the audio signal through speech sound detection; comparing the feature value of the acoustic feature with the system threshold of the acoustic feature of the speech signal and determining whether there is a speech signal in the audio signal based on the comparison result; and determining the speech sound existence probability based on whether there is a speech signal in the audio signal.

In one embodiment, the speech sound detection unit is specifically configured for: determining a probability that there is a speech signal in the audio signal by using a voice activity detection component, wherein the voice activity detection component is obtained by training a neural network model by using speech sound samples and non-speech sound samples in advance.

In one embodiment, the voice activity detection module (530) may be specifically configured for: based on the orientation information of the sound source, determining the speech sound receiving range of the microphone array; acquiring the audio signal in the speech sound receiving range, and determining start and end time points of the speech sounds in the audio signal in the speech sound receiving range; and if a speech sound period determined by the start and end time points of the speech sounds is within the period during which the target user makes the speech sounds, regarding the start and end time points of the speech sounds in the audio signal in the speech sound receiving range as the start and end time points of the speech sounds in the audio signal.

In one embodiment, the voice activity detection module (530), when specifically configured for determining the speech sound start and end time points of the audio signal in the speech sound receiving range, may be further configured for performing audio enhancement processing to the audio signal in the speech sound receiving range; and determining start and end points of the speech sounds in the audio signal after the audio enhancement processing in the speech sound receiving range.

In the apparatus for processing speech signals according to one embodiment, based on the received visual detection information, sound source location information and speech sound existence probability; start and end time points of the target speech sounds of the enhanced audio stream can be determined; the anti-interference capability of the speech processing system to sources of interference in noisy environments is improved; and the robust interaction performance of the speech signal processing system in severe interference environments is realized.

Other details of the apparatus for processing speech signals according to one embodiment are similar to those in the method for processing speech signals according to one embodiment described above with reference to FIG. 1 to FIG. 4, which will not be repetitively described here.

Figure 6:
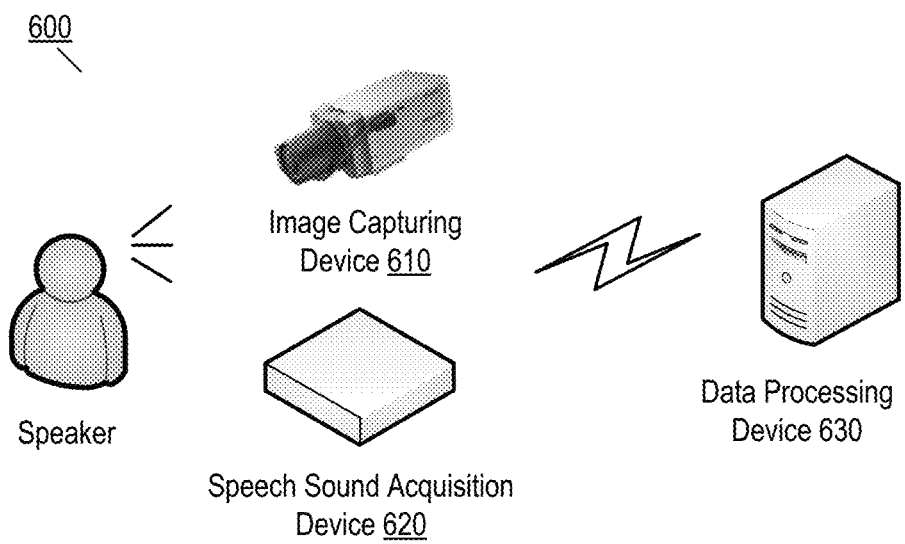
FIG. 6 is a hardware diagram illustrating a system for processing speech signals according to some embodiments of the disclosure.

FIG. 6 is a hardware diagram illustrating a system for processing speech signals according to some embodiments of the disclosure. As illustrated in FIG. 6, the system for processing speech signals (600) according to one embodiment may comprise: an image capturing device (610) configured for acquiring a real-time image; a speech sound acquisition device (620) configured for receiving an audio signal; and a data processing device (630) configured for performing facial recognition by using the real-time image, and detecting a period during which a target user makes speech sounds based on a facial recognition result; locating a sound source in an audio signal received by a microphone array, and determining the orientation information of a sound source in the audio signal; and based on the period during which the target user in the real-time image makes the speech sounds and the orientation information of the sound source, performing a speech sound start and end point analysis to determine start and end time points of the speech sounds in the audio signal.

Other details of the system for processing speech signals according to one embodiment are similar to those in the method for processing speech signals according to one embodiment described above with reference to FIG. 1 to FIG. 4, which will not be repetitively described here.

Figure 7:
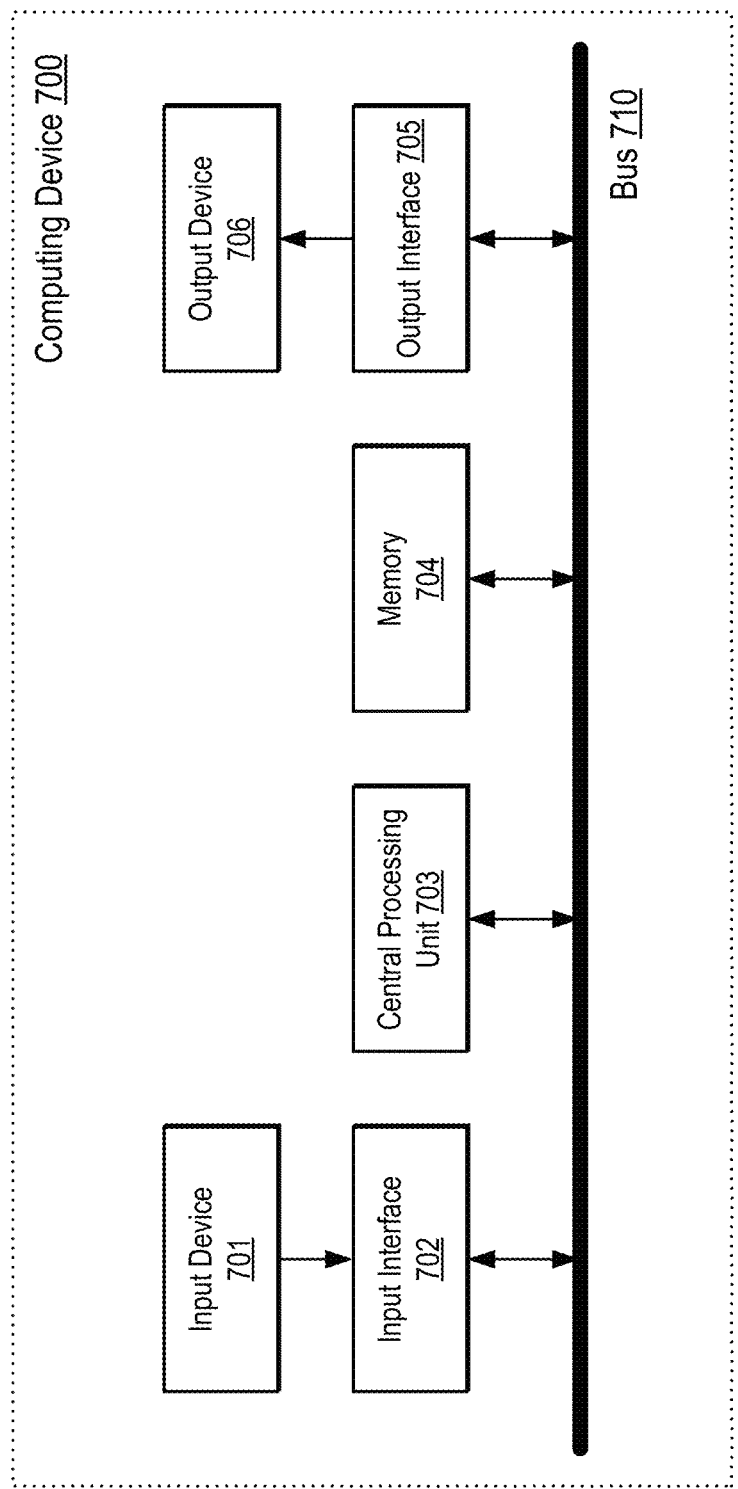
FIG. 7 is a block diagram of a computing device according to some embodiments of the disclosure.

FIG. 7 is a block diagram of a computing device according to some embodiments of the disclosure.

As illustrated in FIG. 7, the computing device (700) comprises an input device (701), an input interface (702), a central processing unit (703), a memory (704), an output interface (705), and an output device (706). Herein, the input interface (702), central processing unit (703), memory (704), and output interface (705) are interconnected through a bus (710). The input device (701) and output device (706) are connected to the bus (710) through the input interface (702) and output interface (705) respectively, and then to other components of the computing device (700). Specifically, the input device (701) receives input information from external sources (e.g., a microphone array or an image capturing device) and transmits the input information to the central processing unit (703) through the input interface (702); the central processing unit (703) processes the input information based on the computer-executable instructions stored in the memory (704) to generate output information, and temporarily or permanently stores the output information in the memory (704), and then the output information is transmitted to the output device (706) through the output interface (705); and the output device (706) outputs the output information to the external part of the computing device (700) for users to use.

In other words, the computing device illustrated in FIG. 7 may also be implemented to comprise a memory storing computer-executable instructions; and a processor capable of implementing the method for processing speech signals described with reference to FIG. 1 to FIG. 4 when executing the computer-executable instructions. Here, the processor can communicate with the microphone array used by the speech processing device to execute the computer-executable instructions based on the relevant information from the speech processing device, thereby realizing the method for processing speech signals described with reference to FIG. 1 to FIG. 4.

In one embodiment, the computing device (700) illustrated in FIG. 7 may be implemented as a device for processing speech signals, wherein the device for processing speech signals comprises a memory and a processor; the memory is used for storing executable program codes; and the processor is used for reading the executable program codes stored in the memory to execute the method for processing speech signals described above with reference to FIG. 1 to FIG. 5.

The above embodiments may be implemented wholly or partially by software, hardware, firmware or any combination thereof. When implemented by software, they may be implemented wholly or partially in the form of computer program products or computer-readable storage media. The computer program products or computer-readable storage media comprise one or more computer instructions. When the computer program instructions are loaded and executed on the computer, the processes or functions described in accordance with the disclosed embodiments are generated wholly or partially. The computer may be a general-purpose computer, a special-purpose computer, a computer network, or any other programmable device. The computer instructions may be stored in a computer-readable storage medium or transmitted from one computer-readable storage medium to another computer-readable storage medium. For example, the computer instructions may be transmitted from a website site, computer, server or data center to another website site, computer, server or data center by a wired means such as coaxial cable, optical fiber or Digital Subscriber Line (DSL), or a wireless means such as infrared, radio or microwave. The computer-readable storage medium may be any available medium that the computer can access or a data storage device such as a server or a data center which contains one or more available media that are integrated. The available media may be magnetic media (e.g., a floppy disk, hard disk, or magnetic tape), optical media (e.g., DVD), or semiconductor media (e.g., Solid state Disk (SSD)), etc.

It needs to be clearly noted that the disclosed embodiments are not limited to the specific configurations and processing described above and illustrated in the drawings. For the sake of brevity, a detailed description of the known methods is omitted here. In the above embodiments, several specific steps are described and shown as examples. However, the processes of the method are not limited to the described and shown specific steps. Those skilled in the art may make various changes, modifications and additions, or change the order between steps after understanding the spirit of the disclosure.

The embodiments described above are only specific disclosed embodiments. Those skilled in the art can clearly understand that, for ease and simplicity of description, with respect to the specific working processes of the systems, modules and units described above, a reference may be made to the corresponding processes in the embodiment of the method, which will not be repetitively described here. The scope of the disclosure is not limited thereto, and any one skilled in the art may easily think of various equivalent modifications or replacements within the technical scope disclosed herein, which, however, shall be still covered by the scope of the disclosure.

What is claimed is:

1. A method comprising:
performing a facial recognition analysis on an image, the image including a user;
detecting, based on the facial recognition analysis, a period during which the user makes speech sounds, the period including a start point indicative of a time when the user starts to make speech sounds;
in response to detecting the start point, locating a sound source in an audio signal received by a microphone array;
determining orientation data of the sound source; and
based on the period and the orientation data, performing a speech sound start and end point analysis to determine a start point and end point of the speech sounds in the audio signal;
wherein the orientation data comprises a horizontal angle, a pitch angle, and a distance of the sound source relative to the microphone array.

2. The method of claim 1, the performing the speech sound start and end point analysis comprising:
based on the orientation data, determining a speech sound receiving range of the microphone array and acquiring the audio signal in the speech sound receiving range;
calculating a speech sound existence probability of the audio signal in the speech sound receiving range;
and performing the speech sound start and end point analysis according to the speech sound existence probability being greater than a preset probability threshold.

3. The method of claim 2, wherein calculating the speech sound existence probability of the audio signal in the speech sound receiving range comprises:
extracting an acoustic feature of the audio signal through the speech sound detection;
comparing a feature value of the acoustic feature with a system threshold associated with the acoustic feature;
determining that a speech signal exists in the audio signal based on a result of comparing; and
calculating the speech sound existence probability based on whether the speech signal exists in the audio signal.

4. The method of claim 2, the calculating the speech sound existence probability of the audio signal in the speech sound receiving range comprising determining a probability that the speech signal exists in the audio signal by using voice activity detection, the using voice activity detection comprising using a neural network model trained using speech sound samples and non-speech sound samples.

5. The method of claim 1, the performing a speech sound start and end point analysis comprising:
determining a speech sound receiving range of the microphone array based on the orientation data of the sound source;
acquiring the audio signal in the speech sound receiving range, and determining start and end time points of the speech sounds in the audio signal in the speech sound receiving range; and
if a speech sound period determined by the start and end time points of the speech sounds is within the period during which the user makes the speech sounds, identifying the start and end time points of the speech sounds in the audio signal in the speech sound receiving range as the start and end time points of the speech sounds in the audio signal.

6. The method of claim 5, the determining the start point and end point of the speech sounds in the audio signal comprising:
performing audio enhancement processing to the audio signal in the speech sound receiving range; and
determining start and end points of the speech sounds in the audio signal after the audio enhancement processing in the speech sound receiving range.

7. The method of claim 1, the performing facial recognition analysis comprising:
detecting a facial image in the image; and
performing facial feature point recognition to the facial image to determine feature points of a mouth edge of the user in the facial image.

8. The method of claim 1, the detecting a period during which the user makes speech sounds comprising:
identifying feature points of a mouth edge in a result of the facial recognition analysis;
identifying a mouth opening and closing action based on feature value change information of the feature points of the mouth edge; and
identifying a continuous period of the mouth opening and closing action as the period during which the user makes speech sounds.

9. A non-transitory computer readable storage medium for tangibly storing computer program instructions capable of being executed by a computer processor, the computer program instructions defining the steps of:
performing a facial recognition analysis on an image, the image including a user;
detecting, based on the facial recognition analysis, a period during which the user makes speech sounds, the period including a start point indicative of a time when the user starts to make speech sounds;
in response to detecting the start point, locating a sound source in an audio signal received by a microphone array;
determining orientation data of the sound source; and
based on the period and the orientation data, performing a speech sound start and end point analysis to determine a start point and end point of the speech sounds in the audio signal;
wherein the orientation data comprises a horizontal angle, a pitch angle, and a distance of the sound source relative to the microphone array.

10. The computer readable storage medium of claim 9, the performing the speech sound start and end point analysis comprising:
- based on the orientation data, determining a speech sound receiving range of the microphone array and acquiring the audio signal in the speech sound receiving range;
- calculating a speech sound existence probability of the audio signal in the speech sound receiving range;
- and performing the speech sound start and end point analysis according to the speech sound existence probability being greater than a preset probability threshold.

11. The computer readable storage medium of claim 10, wherein calculating the speech sound existence probability of the audio signal in the speech sound receiving range comprises:
- extracting an acoustic feature of the audio signal through the speech sound detection;
- comparing a feature value of the acoustic feature with a system threshold associated with the acoustic feature;
- determining that a speech signal exists in the audio signal based on a result of comparing; and
- calculating the speech sound existence probability based on whether the speech signal exists in the audio signal.

12. The computer readable storage medium of claim 10, the determining a speech sound existence probability of the audio signal in the speech sound receiving range comprising determining a probability that the speech signal exists in the audio signal by using voice activity detection, the using voice activity detection comprising using a neural network model trained using speech sound samples and non-speech sound samples.

13. The computer readable storage medium of claim 9, the performing a speech sound start and end point analysis comprising:
- determining a speech sound receiving range of the microphone array based on the orientation data of the sound source;
- acquiring the audio signal in the speech sound receiving range, and determining start and end time points of the speech sounds in the audio signal in the speech sound receiving range; and
- if a speech sound period determined by the start and end time points of the speech sounds is within the period during which the user makes the speech sounds, identifying the start and end time points of the speech sounds in the audio signal in the speech sound receiving range as the start and end time points of the speech sounds in the audio signal.

14. The computer readable storage medium of claim 13, the determining the start point and end point of the speech sounds in the audio signal comprising:
- performing audio enhancement processing to the audio signal in the speech sound receiving range; and
- determining start and end points of the speech sounds in the audio signal after the audio enhancement processing in the speech sound receiving range.

15. The computer readable storage medium of claim 9, the performing facial recognition analysis comprising:
- detecting a facial image in the image; and
- performing facial feature point recognition to the facial image to determine feature points of a mouth edge of the user in the facial image.

16. The computer readable storage medium of claim 9, the detecting a period during which the user makes speech sounds comprising:
- identifying feature points of a mouth edge in a result of the facial recognition analysis;
- identifying a mouth opening and closing action based on feature value change information of the feature points of the mouth edge; and
- identifying a continuous period of the mouth opening and closing action as the period during which the user makes speech sounds.

17. An apparatus comprising:
- a processor;
- and a storage medium for tangibly storing thereon program logic for execution by the processor, the stored program logic comprising:
- logic, executed by the processor, for performing a facial recognition analysis on an image, the image including a user,
- logic, executed by the processor, for detecting, based on the facial recognition analysis, a period during which the user makes speech sounds, the period including a start point indicative of a time when the user starts to make speech sounds,
- logic, executed by the processor and in response to detecting the start point, for locating a sound source in an audio signal received by a microphone array,
- logic, executed by the processor, for determining orientation data of the sound source, and
- logic, executed by the processor, for, based on the period and the orientation data, performing a speech sound start and end point analysis to determine a start point and end point of the speech sounds in the audio signal;
- wherein the orientation data comprises a horizontal angle, a pitch angle, and a distance of the sound source relative to the microphone array.

18. The apparatus of claim 17, logic for the performing the speech sound start and end point analysis comprising:
- logic, executed by the processor, for, based on the orientation data, determining a speech sound receiving range of the microphone array and acquiring the audio signal in the speech sound receiving range;
- logic, executed by the processor, for performing speech sound detection on the audio signal in the speech sound receiving range to determine a speech sound existence probability of the audio signal in the speech sound receiving range; and
- logic, executed by the processor, for performing the speech sound start and end point analysis if the speech sound existence probability is greater than a preset probability threshold.

\* \* \* \* \*